Feb. 5, 1929.
T. M. GUNN
1,701,154
LUBRICATING DEVICE
Filed Dec. 29, 1924
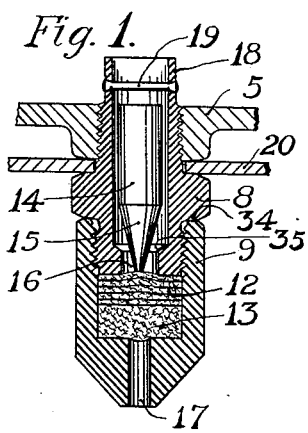
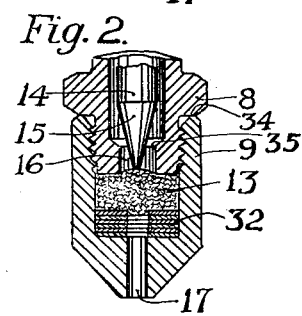
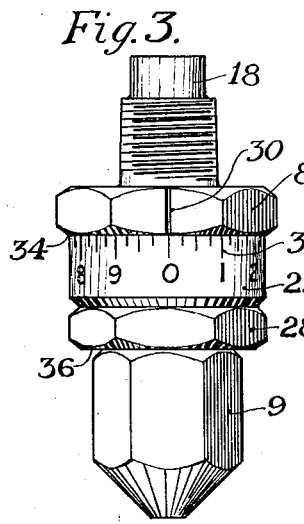
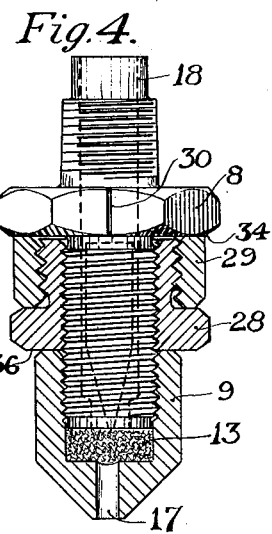
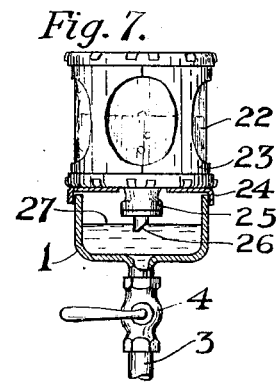
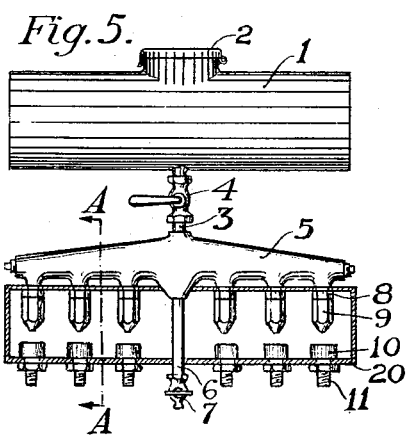
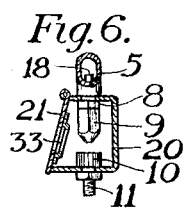
INVENTOR
Thomas M. Gunn
by
Ward Crosby + Smith
attorneys Patented Feb. 5, 1929.

1,701,154

UNITED STATES PATENT OFFICE.

THOMAS M. GUNN, OF BROOKLYN, NEW YORK, ASSIGNOR OF ONE-SIXTH TO GORHAM CROSBY, OF GLEN RIDGE, NEW JERSEY.

LUBRICATING DEVICE.

Application filed December 29, 1924. Serial No. 758,505.

The invention relates to improvements in lubricating devices and more particularly to means for regulating the rate of flow of a fluid by interposing an adjustable means of resistance in the path of flow, and relates more particularly to lubricating devices in which a fluid lubricant, actuated by gravity, is supplied to a machine part requiring lubrication at a rate controlled by such means of resistance. Further purposes and more specific features of this invention will more clearly appear from the detail description following, taken in connection with the accompanying drawings.

In the drawings one form of the invention is illustrated in Fig. 1, which is a sectional view of the device for regulating the flow of lubricant. Fig. 2 shows by a sectional view, a modification in the means of regulating the flow. A further modified form of the device is shown in Fig. 3, which is an external view, and Fig. 4, is a part sectional view of the same. Fig. 5 shows an external view of one arrangement of a complete six feed lubricator embodying the invention. Fig. 6 is a sectional view taken on the line A—A of Fig. 5. Fig. 7 illustrates, by a part sectional view, a modification of a part of the lubricator to further improve the uniformity of lubricant flow.

One special feature of this invention relates to the means provided for regulating the flow of fluid, and consists of a porous and somewhat elastic substance, such as felt, interposed in the path of flow of the fluid and subjected to pressure, the intensity of the pressure being regulated so as to limit the flow of fluid to the desired rate.

As illustrated in Fig. 1, the regulating device for the flow of lubricant in the lubricator, consists of a specially formed nipple, 8, adapted to be screwed into another part of the lubricator, 5, and threaded externally at the lower end; and a specially formed cap, 9, which is internally threaded to screw on the lower, threaded portion of the nipple, 8, until its end has seated against an enlarged portion of the nipple, 8; and porous, compressible members, 12 and 13, inserted within the cap, 9, and compressed between the base of the recess in said cap and the lower end of the nipple, 8, when the cap is screwed in place. The nipple, 8, is made with a central hole, 16, through its axis, and the cap, 9, is made with a hole, 17, through its lower end, said holes being for the passage of lubricant. When a fluid lubricant is supplied under pressure to the regulating device, it is compelled to flow through the porous members, 12 and 13, and its rate of flow is thereby restricted. Since, in this device, it is intended that the cap, 9, shall be screwed on the nipple, 8, until it has reached a shoulder, 34, formed on the nipple, the space allowed for the porous material is fixed in extent. The method of regulating the amount of compression and thereby regulating the flow of lubricant is to insert more porous material, or remove portions of the porous material as may be required. The porous member, 13, is intended to be of a size that will approximately fill the entire space allowed for the porous material without compression, and the use of the member, 13, alone, without the additional members, 12, would result in a comparatively free flow of lubricant. The porous members, 12, are made in thin laminations, so that one or more laminæ may be inserted, the degree of compression being increased with each additional lamina. The rate of flow of lubricant is thus further restricted for each additional lamina due both to greater compression and due to a greater quantity of porous material through which the lubricant must pass.

The hole, 16, through the nipple, 8, is drilled to two diameters, thus forming a valve seat, 35, on which the tapered portion, 15, of the valve, 14, may seat when the cap, 9, is removed. When the cap is replaced on the nipple, 8, the porous member, 12 or 13, comes in contact with the lower end of the valve, 14, and lifts it from the seat. A pin, 19, retains the valve within the nipple when the device is inverted in handling. The member, 20, in this view (Fig. 1) is a portion of a casing surrounding the feed regulating device, more completely shown in Fig. 5 and Fig. 6.

Fig. 2, showing the cap, 9, and a portion of the nipple, 8, and valve, 14, illustrates another method of applying the desired amount of pressure to a porous member, 13. Instead of inserting laminæ of porous material, 12 in Fig. 1, there is inserted a variable number of metal washers, 32, by which the space for the porous material is decreased, thus accomplishing the increase of pressure and the consequent decrease of flow of lubricant as desired. The action of the valve, 14, is as previously described for Fig. 1.

The modification of the feed regulating device illustrated in Figures 3 and 4 is so arranged that the cap, 9, when screwed in place seats against the face, 36, of an adjustable collar, 28, whose position determines the amount of space into which the porous member, 13, is compressed, thereby determining the degree of compression and the consequent restriction of the flow of lubricant. The adjustable collar, 28, is provided with an internal screw thread to engage with the lower threaded portion of the nipple, 8, and a portion of its exterior is provided with a screw thread of greater pitch, thereby engaging a screw thread on the interior of a lock ring, 29. By screwing the adjustable collar, 28, downward on the nipple, 8, and advancing the lock ring, 29, upward on the adjustable collar, 28, until it seats against the shoulder, 34, on the nipple, 8, and finally turning the adjustable collar, 28, in a direction to advance it upward until all back-lash is taken up, the adjustable collar, 28, becomes firmly secured so that its lower face, 36, forms a fixed abutment against which the cap, 9, may be seated in the position desired. Furthermore, by means of graduations, 31, on the lock ring, 29, which may be read by reference to a mark, 30, cut in the enlarged portion of the nipple, 8, the relative position of the adjustable collar, 28, may be observed. By this means, in similar fittings, with similar porous members, 13, it is possible to produce equality of compression of the porous members, whereby equal flow of lubricant is accomplished.

One form of a complete lubricator embodying my invention and illustrated in Fig. 5 consists of a lubricant reservoir, 1, provided with a hinged cover, 2; an outlet pipe, 3, in which a shut off cock, 4, is fitted; a manifold, 5, connected to the pipe, 3, having a sediment pocket, 6, and drain cock, 7; and six nipples, 8, and caps, 9, constituting six devices for regulating the flow of lubricant, of a type already described; six funnel-like cups, 10, connecting by nipples, 11, to pipes (not shown) which lead to the various bearings or other machine parts to be lubricated; and a supporting frame or housing, 20, which supports the funnel-like cups.

Fig. 6, which is a part sectional view on the line A—A, shows the manner in which the housing, 20, is connected to the manifold, 5, and nipples, 8, and encloses the devices for regulating the flow of lubricant, 8 and 9, and the funnel-like cups, 10, with a hinged cover, 21, in which a glass or other transparent window, 33, renders the rate of flow of lubricant visible. The housing, 20, and hinged cover, 21, serve to prevent the exposure of the lubricant to dust and other foreign matter.

If sediment and water that may be present in the lubricant were to reach the porous member, they would influence the rate of lubricant flow. To guard against such interference, the upper part of the special nipple, 8, is prolonged as shown at 18 in Figures 1, 3, 4 and 6, so as to extend into the manifold, 5. Sediment and water heavier than the lubricant tend to sink to the bottom of the manifold, 5, and pass into the sediment pocket, 6, from which they may be drawn by the drain cock, 7.

Fig. 7, illustrating a modification of a portion of the lubricator, represents a lubricant reservoir, 1, with an outlet pipe, 3, and shut-off cock, which parts may be made to replace the corresponding parts in Fig. 5; and an inverted glass bottle, 22, provided with a sheet metal armor, 23, connected to a cover, 24, fitting over the reservoir, 1. The neck of the bottle, 25, extending into the reservoir, 1, is provided with an opening 26. The inverted bottle, 22, serves as a source of supply of lubricant to the reservoir, 1, to maintain a substantially constant level, so that a nearly uniform flow of lubricant from the devices, 8—9, may be maintained. Since the opening, 26, is the only path by which lubricant may leave the bottle or by which air may enter the same; and since the pressure of the atmosphere permits lubricant to leave the bottle only when an equal volume of air enters; therefore, lubricant flows from the bottle, 22, only when the level of lubricant in the reservoir, 1, is below the opening, 26, at which time air can also enter by the same opening. Lubricant thus passing into the reservoir, 1, raises the level therein. Discharge of lubricant from the bottle, 22, ceases when the level in the reservoir, 1, has risen sufficiently to close the opening, 26.

Attention is called to a feature that is common to the three variations of the device for regulating the flow of lubricant shown in Figures 1, 2, 3 and 4. In each, means are provided for producing definite degrees of compression of a porous member, 12 and 13, in Fig. 1, and 13 in Figures 2 and 4. By employing porous members of a standard size and quality in a number of like devices, the rate of feed of all devices may be made the same by employing the regulating means in a similar manner in all of said devices; and by variations in the regulating means, greater or less feeds may be produced at will. In Fig. 1, the regulating means consists of a variable number of laminæ, 12, of porous material and the degree of regulation is known to the operator by the number of laminæ employed. In Fig. 2, the regulating means consists of a variable number of thin solid members or washers, 32, and the degree of regulation is known to the operator by the number of washers employed. In Figures 3 and 4 the regulating means consists of an adjustable collar, 28, whose position is fixed by the lock ring, 29, and whose position determines the degree of regulation, which is known to the operator by the reading of the graduations, 31. Each of these devices, therefore, constitutes a means of imposing a predetermined degree of compression on a porous member, so located in the path of flow of the lubricant as to offer resistance to its motion and thereby to regulate the rate of its flow.

The valve, 14, shown in Fig. 1 is of advantage when taking apart the device for any purpose such as for cleaning or replacing the porous member, since it prevents the loss of oil while the porous member is absent from its place. Such a valve may not always, however, be necessary, in which case it may be omitted.

It is evident that the construction of the device can be widely varied without departing from the spirit of the invention. For example, in the device illustrated in Figures 3 and 4 the means of fixing the position of the adjustable member or ring, 28, and of determining its position can be widely varied. The complete lubricator as illustrated in Fig. 5, can also be widely varied in construction and form, being made in a single piece or built up of many parts, and the manifold, 5, may be constructed of standard or special pipe fittings such as a pipe cross and a number of pipe T's, nipples and plugs. The housing, 20, may be omitted in cases where dust is not present or objectionable, or may be replaced by only a framework to connect or support the parts. Furthermore, the number of devices for regulating the flow of lubricant may be varied from one to any number.

Whereas the flow of lubricant is made visible in the device shown in Fig. 6 by a glass window, 33, in the door, 21, it is evident that this may be omitted and the door opened when it is desired to observe the flow, or the door and housing may be omitted and the individual devices, 8—9, and funnel shaped cups, 10, may be fitted with separate glasses of tubular form to protect the lubricant from dust while still rendering the rate of lubricant flow visible.

Considered as a means of regulating the flow of a lubricant, the invention described has a distinct advantage over the needle valve commonly used for a similar purpose, since the small opening of the needle valve is easily clogged by a particle of dust or lint, whereas many such particles may fall on the surface of the porous member without interfering materially with the rate of flow. Moreover, in lubricators fitted with needle valve regulation, it is necessary to regulate the valve by observing the number of drops falling per minute, while in the devices described herein the operator need only to learn by testing one device what degree of regulation is necessary to produce a desired rate of feed, and thereafter he may install other devices with the same degree of regulation knowing that approximately the same rate of lubricant flow will result. Comparison of the device herein described with the wick feed oiler of siphon type discloses equally important advantages.

Considered as a means of regulating the flow of other fluids than lubricants, as, for instance, a combustible gas supplied to a burner or a fuel oil supplied to a burner or carburetor, the devices described herein possess advantages over the needle valve sometimes used for such purposes similar to the advantages described above in relation to lubricating devices.

I claim:

1. An oil feeding device having means feeding the oil by gravity including compressible porous means interposed in the path of flow of the oil for varying and regulating the rate of flow, means automatically stopping the flow of oil upon removal of said compressible porous means, and means connected with the device for removing sediment from the oil before it reaches said compressible porous means.

2. In a device of the class described means for regulating the flow of a lubricant including porous means interposed in the path of flow of the lubricant, compression of which porous means regulates the flow of the lubricant, and a valve which automatically closes when the porous means is removed and automatically opens when the porous means is replaced.

3. In a device for regulating the flow of a fluid from a region of one pressure to another region of lower pressure, means for varying and regulating the rate of flow of said fluid consisting of a multiplicity of compressible porous members interposed in the path of flow within a space of fixed volume, the degree of compression being determined by the number of porous members interposed and means automatically stopping the flow of said fluid upon removal of said porous members.

4. In a lubricating device wherein a fluid lubricant is fed under the influence of gravity, means for varying and regulating the rate of lubricant flow including compressible porous means interposed in the path of flow of the lubricant and means whereby various predetermined and indicated degrees of compression may be imposed on the porous means, and a valve which automatically closes to stop the flow of lubricant when the porous means is removed and automatically opens when the porous means is replaced.

5. In a lubricating device wherein a fluid lubricant is fed under the influence of gravity, means for varying and regulating the rate of lubricant flow including compressible porous means interposed in the path of flow of the lubricant and means whereby various predetermined and indicated degrees of compression may be imposed on the porous means, and means separating impurities from the lubricant as it flows to said porous means and before the lubricant reaches said porous means, and a valve which automatically closes to stop the flow of lubricant when the porous means is removed and automatically opens when the porous means is replaced.

6. A lubricating device having in combination porous means interposed in the path of flow of the lubricant, the compression of which regulates the flow of the lubricant, means separating impurities from the lubricant as it flows to said porous means and before the lubricant reaches said porous means, and a valve which automatically closes to stop the flow of lubricant when the porous means is removed and automatically opens when the porous means is replaced.

7. The method of regulating the rate of feed of a lubricant which consists in causing the lubricant to flow through a multiplicity of compressible porous members interposed within a space of fixed volume and varying the compression of said porous members by varying the number of porous members interposed in said space of fixed volume to vary the rate of flow of lubricant therethrough.

8. The method of regulating the rate of feed of a lubricant which consists in causing the lubricant to flow through a multiplicity of compressible porous members interposed within a space of fixed volume and varying the compression of said porous members by inserting in said fixed space a varying number of members, to vary the rate of flow of lubricant through the device.

In testimony whereof I have signed my name to this specification.

THOMAS M. GUNN.